United States Patent
Yamanoi et al.

(10) Patent No.: US 10,789,491 B2
(45) Date of Patent: Sep. 29, 2020

(54) TRAFFIC LIGHT RECOGNITION DEVICE AND TRAFFIC LIGHT RECOGNITION METHOD

(71) Applicant: Nissan Motor Co., Ltd., Yokohama-shi, Kanagawa (JP)

(72) Inventors: Daiki Yamanoi, Kanagawa (JP); Haruo Matsuo, Kanagawa (JP); Takahiko Oki, Kanagawa (JP); Akira Suzuki, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/743,905

(22) PCT Filed: Jul. 13, 2015

(86) PCT No.: PCT/JP2015/070042
§ 371 (c)(1),
(2) Date: Jan. 11, 2018

(87) PCT Pub. No.: WO2017/009934
PCT Pub. Date: Jan. 19, 2017

(65) Prior Publication Data
US 2018/0204077 A1    Jul. 19, 2018

(51) Int. Cl.
*G06K 9/00* (2006.01)
*G08G 1/0962* (2006.01)
(Continued)

(52) U.S. Cl.
CPC ......... *G06K 9/00825* (2013.01); *B60W 40/04* (2013.01); *G05D 1/0246* (2013.01);
(Continued)

(58) Field of Classification Search
CPC . G06K 9/00825; G05D 1/0246; B60W 40/04; B60W 2420/42
See application file for complete search history.

(56) References Cited

U.S. PATENT DOCUMENTS 9,389,093 B2    7/2016 Kojo
2009/0303077 A1*    12/2009 Onome ............ G08G 1/096716
340/901

(Continued)

FOREIGN PATENT DOCUMENTS

JP    2005202761 A    7/2005
JP    2007219758 A    8/2007

(Continued)

*Primary Examiner* — Menatoallah Youssef
(74) *Attorney, Agent, or Firm* — Young Basile Hanlon & MacFarlane, P.C.

(57) ABSTRACT

A traffic light recognition device includes: a camera that captures an image around a vehicle; a map information acquisition unit configured to acquire map information around the vehicle; a self-position detector configured to detect the position of a self-position on a map; a traffic light position estimator configured to estimate the position on an image of a traffic light on the basis of the self-position and the map information; a vehicle behavior estimator configured to estimate a vehicle behavior; a traffic light detection area calculator configured to set a detection area of the traffic light onto the image based on the estimated position on the image of the traffic light and an amount of displacement of the position on the image of the traffic light due to a behavior of the vehicle; and a traffic light recognition unit configured to detect a traffic light from the detection area.

8 Claims, 11 Drawing Sheets

(51) Int. Cl.
*H04N 5/225* (2006.01)
*B60W 40/04* (2006.01)
*G05D 1/02* (2020.01)

(52) U.S. Cl.
CPC ......... *G08G 1/09623* (2013.01); *H04N 5/225* (2013.01); *B60W 2420/42* (2013.01)

(56) References Cited

U.S. PATENT DOCUMENTS

2016/0054138 A1\* 2/2016 Kojo ...................... B60R 11/04
701/423
2018/0308353 A1\* 10/2018 He .................... B60W 50/0098

FOREIGN PATENT DOCUMENTS

| | | |
|---|---|---|
| JP | 2007241469 A | 9/2007 |
| JP | 2013218571 A | 10/2013 |
| JP | 2016143324 A | 8/2016 |
| WO | 2014162797 A1 | 10/2014 |

\* cited by examiner

TRAFFIC LIGHT RECOGNITION DEVICE AND TRAFFIC LIGHT RECOGNITION METHOD

TECHNICAL FIELD

The present invention relates to a traffic light recognition device and a traffic light recognition method for recognizing a traffic light present along a traveling path of a vehicle.

BACKGROUND

Japanese Patent Laid-Open Publication No. 2007-241469 describes a method including the steps of: estimating the position of a traffic light present along a traveling path of a vehicle on the basis of map information and a self-position estimation result; setting a detection area of a traffic light into an image captured by a camera; and image-processing a traffic light present in this detection area to detect a lighting state of this traffic light.

However, a time difference occurs between a timing for an estimation result of a self-position to be updated and a timing for an image to be captured by a camera, so with the method described in Japanese Patent Laid-Open Publication No. 2007-241469, the detection area of a traffic light will be set at a position which is backward to the past by the time difference, and a traffic light may deviate from the detection area.

As described above, in the conventional technique disclosed in Japanese Patent Laid-Open Publication No. 2007-241469, a time difference occurs between a timing for an estimation result of a self-position to be updated and a timing for an image to be captured by a camera. Therefore, when the behavior of a vehicle is large, due to this time difference a traffic light recognition area to be set onto the image captured by the camera will be set at a position which is backward to the past by the time difference, and thus the detection area of a traffic light might not be able to be set to an appropriate position on the image captured by the camera.

SUMMARY

The present invention has been made in order to solve the conventional problem, and an object thereof is to provide a signal recognition device and traffic light recognition method capable of appropriately setting a detection area of a traffic light even when a time difference occurs between a timing for an estimation result of a self-position to be updated and a timing for an image to be captured by a camera.

A traffic light recognition device according to an aspect of the present invention includes: an imaging unit configured to capture an image around a vehicle; a map information acquisition unit configured to acquire map information around the vehicle; a self-position detector configured to detect a self-position of the vehicle; and a traffic light position estimator configured to estimate the position on an image of a traffic light on a basis of the self-position and the map information. The traffic light recognition device further includes: a vehicle behavior estimator configured to estimate a behavior of the vehicle; a traffic light detection area setting unit configured to set a detection area of the traffic light on the image on a basis of a position on the image of the traffic light and a displacement amount of the position on the image of the traffic light due to a behavior of the vehicle; and a traffic light recognition unit configured to detect a traffic light from the detection area.

A traffic light recognition method according to an aspect of the present invention includes the steps of: capturing an image around a vehicle; acquiring map information around the vehicle; detecting a self-position on a map of the vehicle; and estimating the position on an image of a traffic light on a basis of the self-position and the map information. The traffic light recognition method further includes the steps of: estimating a behavior of the vehicle; setting a detection area of the traffic light onto the image on a basis of the estimated position on the image of the traffic light and a displacement amount of the position on the image of the traffic light due to the vehicle behavior; and detecting a traffic light from the detection area.

BRIEF DESCRIPTION OF THE DRAWINGS

FIGS. 4A and 4B are timing charts illustrating the action of the traffic light recognition device according to the first embodiment of the present invention, FIG. 4A illustrates the timing for an image to be captured, and FIG. 4B illustrates the timing for a self-position estimation result to be updated;

FIGS. 9A and 9B are timing charts illustrating the action of a traffic light recognition device according to a modified example of the first embodiment of the present invention, FIG. 9A illustrates the timing for an image to be captured, and FIG. 9B illustrates the timing for a self-position estimation result to be updated;

FIGS. 13A and 13B relates to the third embodiment of the present invention.

DETAILED DESCRIPTION OF THE EMBODIMENTS

Hereinafter, embodiments of the present invention will be explained with reference to the drawings.

Explanation of First Embodiment

Figure 1:
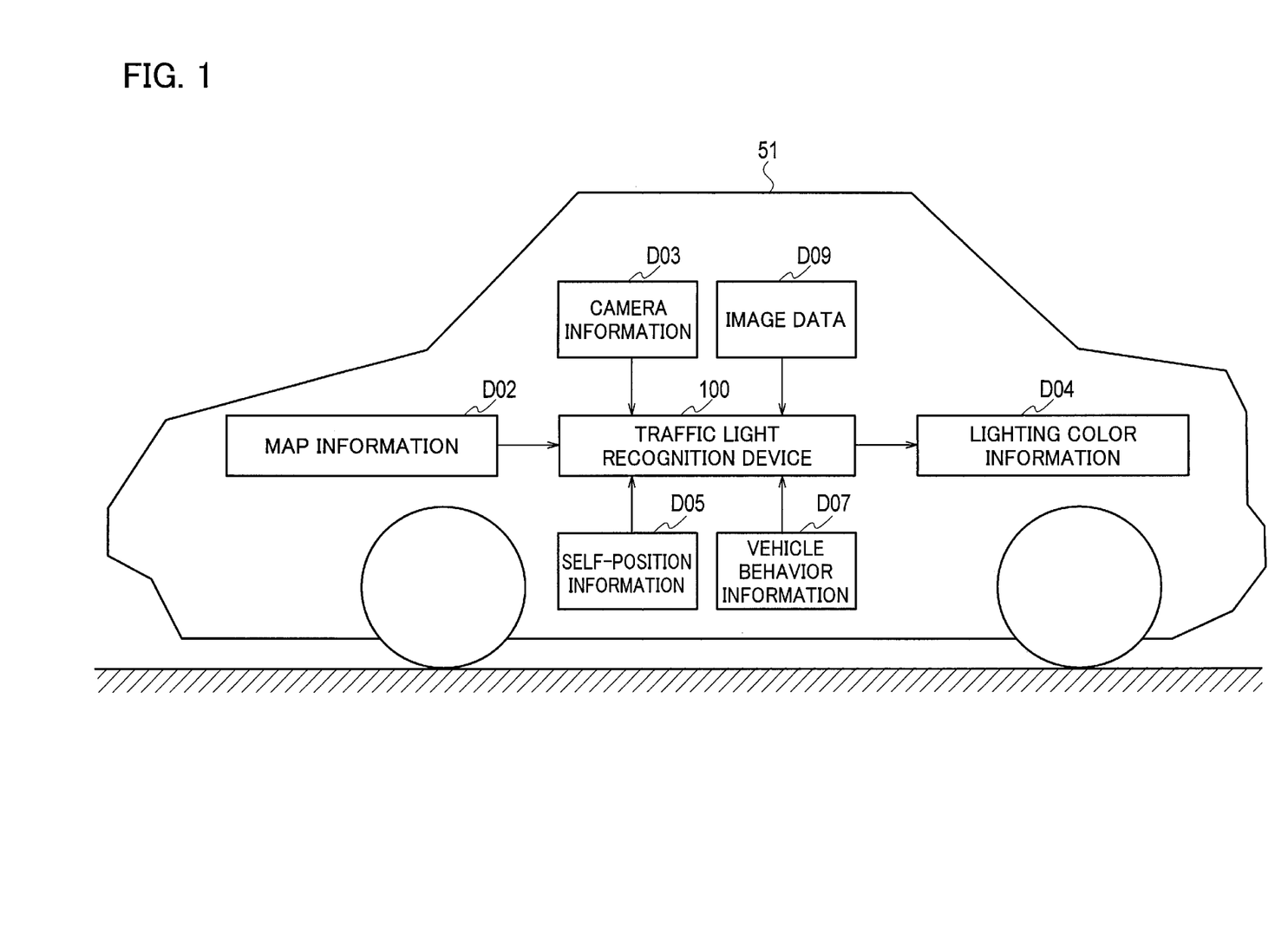
FIG. 1 is a block diagram illustrating a configuration of a traffic light recognition device and peripheral devices thereof according to an embodiment of the present invention.
Figure 2:
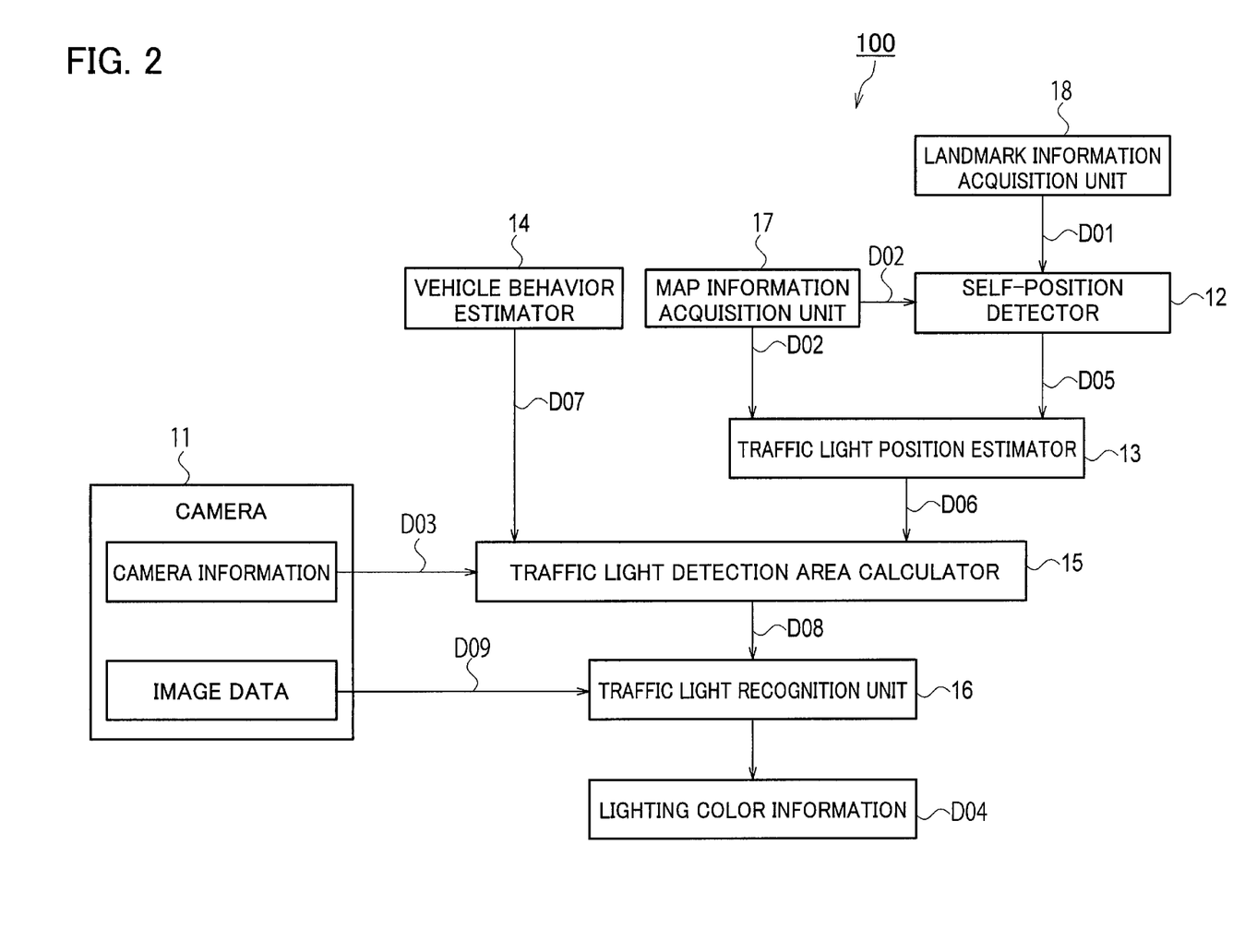
FIG. 2 is a block diagram illustrating a detailed configuration of a traffic light recognition device according to first and second embodiments of the present invention.

FIG. 1 is a block diagram illustrating a configuration of a traffic light recognition device and peripheral devices thereof according to a first embodiment of the present invention. Further, FIG. 2 is a block diagram illustrating the detail of a traffic light recognition device 100 illustrated in FIG. 1.

As illustrated in FIG. 1, the traffic light recognition device 100 is mounted on a vehicle 51, and receives map information D02, camera information D03, self-position information D05, vehicle behavior information D07, and image data D09 from various devices mounted on this vehicle 51. Then, the traffic light recognition device 100 outputs lighting color information D04 indicative of the lighting color of a traffic light to a device (not illustrated) at the subsequent stage. This lighting color information D04 is used, for example, for automatic operation control and the like.

The camera information D03 is the information about the installation position of a camera 11 (see FIG. 2) relative to the vehicle 51. Upon acquisition of three-dimensional (3D) information indicative of the direction on a map of the vehicle 51, an imaging area around the vehicle can be estimated by the camera 11 on the basis of the camera information D03.

The map information D02 is the information provided from a map data base including the map data (map information around a vehicle) of a traveling path on which a vehicle will travel, and includes the position information about a target, such as a ground landmark present along the traveling path, the position information about a traffic light, and the like.

As illustrated in FIG. 2, the traffic light recognition device 100 includes: the camera 11 (imaging unit), a self-position detector 12, a traffic light position estimator 13, a vehicle behavior estimator 14, a traffic light detection area calculator 15 (traffic light detection area setting unit), a traffic light recognition unit 16, a map information acquisition unit 17, and a landmark information acquisition unit 18.

The camera 11 is a digital camera provided with a solid-state image sensor, such as a CCD or a CMOS, for example, and captures an image around a traveling path of the vehicle 51 to acquire a digital image of a peripheral area. The camera 11 outputs the captured image to the traffic light recognition unit 16 as the image data D09. Moreover, the camera 11 has stored therein the information about the installed position of the camera 11 relative to the vehicle 51, and outputs the same to the traffic light detection area calculator 15 as the camera information D03. For the information about the installation position of the camera 11, for example a mark or the like for calibration is installed at a position known to the vehicle 51, so that the installation position can be calculated from a position on an image captured by the camera 11.

The map information acquisition unit 17 acquires the position information about a target, such as a ground landmark, present in a vicinity of a traveling path, the position information about a traffic light, and the like from a map data base including the map data (map information about a peripheral vicinity of a vehicle) about the traveling path on which a vehicle travels. The map information acquisition unit 17 outputs these pieces of information to the self-position detector 12 and traffic light position estimator 13 as the map information D02.

The landmark information acquisition unit 18 is, for example, a sensing camera, laser radar, or the like mounted on a vehicle, and recognizes ground landmarks (road marks (lane marks, stop lines, texts), a curbstone, a traffic light, a sign, etc.) to acquire the information about the relative position relative to the vehicle 51. The landmark information acquisition unit 18 outputs this information to the self-position detector 12 as landmark information.

The self-position detector 12 acquires landmark information D01 and map information D02, detects, on the basis of these pieces of information, the current position on the map of the vehicle 51, and outputs this as the self-position information D05. As previously described, the landmark information D01 includes the information indicative of the relative positional relationship of a ground landmark relative to the vehicle 51. Accordingly, a current position on the map of the vehicle 51 can be detected by collating the position information about this landmark information D01 with the position information about a ground landmark included in the map information D02.

Here, "position" includes a coordinate and an attitude. Specifically, the position of a ground landmark includes the coordinate and attitude thereof, and the position of the vehicle 51 includes the coordinate and attitude thereof. The self-position detector 12 outputs, as the self-position information D05, a coordinate (x, y, z) in a coordinate system serving as a reference and an attitude (yaw, pitch, roll) which is in the rotation direction in each coordinate axis.

The traffic light position estimator 13 estimates the relative position of a traffic light relative to the vehicle 51 on the basis of the map information D02 and self-position information D05. The position information about each traffic light present along a traveling path of the vehicle 51 is registered with the map information D02 as a coordinate. Accordingly, the relative position of a traffic light relative to the vehicle 51 can be calculated on the basis of the coordinate of the traffic light and the coordinate and attitude of the vehicle 51. Then, the traffic light position estimator 13 outputs the calculated relative position of the traffic light as traffic light relative positional information D06.

The vehicle behavior estimator 14 calculates, using various information, such as the vehicle speed, yaw rate, steering angle (amount of steering) of the vehicle 51, a time difference (to be designated by "ΔT") from a timing for a self-position estimation result to be updated to a timing for an image to be captured, and further calculates the movement amount of the vehicle 51 during this time difference ΔT. Then, the vehicle behavior estimator 14 outputs this movement amount as the vehicle behavior information D07. A method for calculating a movement amount will be described later. Note that, the above-described steering angle is an angle at which the steering wheel of a vehicle tilts in the horizontal direction with respect to the straight forward direction, and the steering angle can be substituted by, for example, a movement amount or the like of the spline shaft of a rack mechanism in a rack-and-pinion steering mechanism, as the steering amount.

The traffic light detection area calculator 15 corrects the relative position between the vehicle 51 and a traffic light on the basis of the camera information D03, traffic light relative positional information D06, and vehicle behavior information D07, and further sets the detection area of a traffic light into an image captured by the camera 11, on the basis of the camera information D03 and the corrected relative position.

The traffic light detection area calculator 15 outputs this detection area to the traffic light recognition unit 16 as traffic light detection area information D08.

That is, a timing for an image to be captured by the camera 11 does not coincide with a timing for a self-position estimation result of the vehicle 51 to be updated by the self-position detector 12, so the position of a traffic light present in an image cannot be accurately estimated due to the time difference ΔT between the both timings, and in turn the detection area cannot be accurately set. Specifically, if the self-position estimation result is updated at time t1 illustrated in FIGS. 4A and 4B and an image is captured at time t11 which has elapsed by the time difference ΔT, the vehicle 51 has already moved during the time difference ΔT, and therefore the detection area to be set within the image will be located at a position shifted from the position of a traffic light within the image.

Figure 4A:
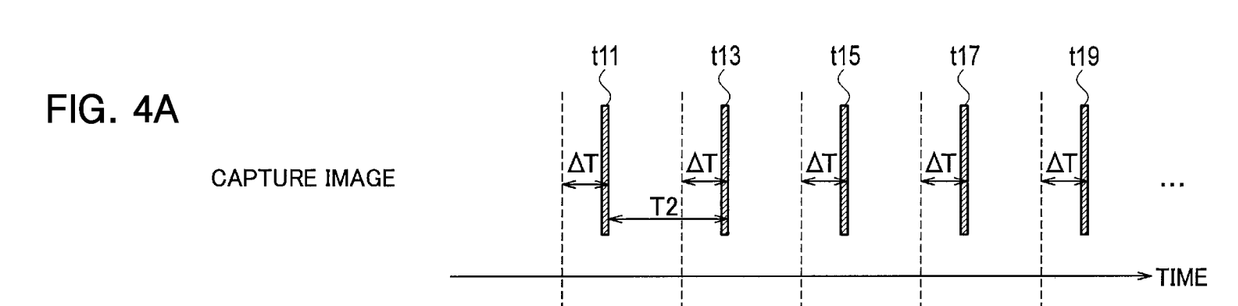
Figure 4B:
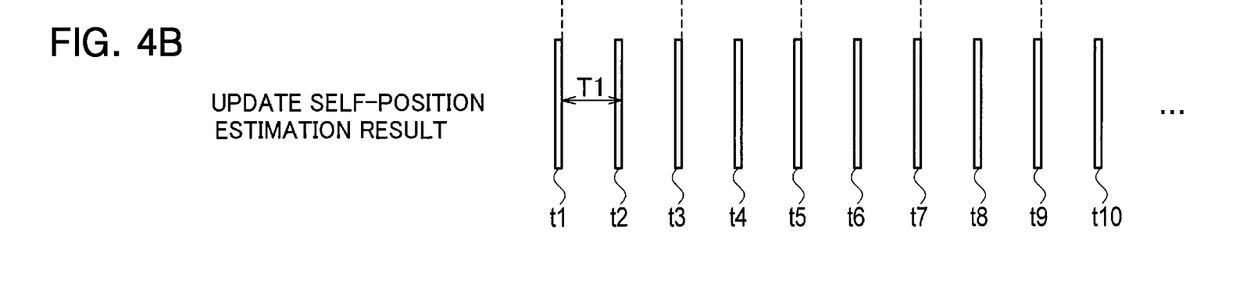

Accordingly, in the traffic light detection area calculator 15, the movement amount of the vehicle 51 during the time difference ΔT is estimated on the basis of the vehicle behavior information D07 estimated by the vehicle behavior estimator 14, and on the basis of this movement amount, the self-position of the vehicle 51 at time t11 of FIGS. 4A and 4B is estimated. Then, the detection area is set taking into consideration this movement amount. That is, the detection area of a traffic light is set on the basis of the estimated position of the traffic light based on the map information D02 and self-position information D05 and on the basis of a displacement amount of the estimated position of the traffic light due to the vehicle behavior. In this case, if the relative position between a traffic light and the vehicle 51 is obtained, since the camera 11 is fixed to the vehicle 51, the position of the traffic light within an image can be estimated by performing conversion from a real space coordinate to an image coordinate on the basis of installation information among the camera information D03, and in turn the detection area can be set.

The traffic light recognition unit 16 illustrated in FIG. 2 recognizes the lighting color of a traffic light on the basis of the image data D09 captured by the camera 11 and the traffic light detection area information D08. Specifically, image processing for recognizing the lighting color of a traffic light is performed on the detection area set in the image data D09.

As the method for image processing, a signaling lamp of a traffic light can be detected using, for example, a method for detecting a blinking light in synchronization with the AC cycle of a commercial power supply or a method for determining the similarity between the characteristics, such as the hues and round shapes of red, green, and yellow lamps. Other than these methods, a known image processing for detecting a traffic light can be applied. Recognition processing of a traffic light is performed not on the whole image data D09 captured by the camera 11 but on a detection area set as a part thereof, so that the load in the information processing for detecting a traffic light can be reduced and a traffic light can be detected quickly. Then, the lighting color information D04 is output to a device at the subsequent stage. Note that the recognition processing of a traffic light is not limited to the above-described method, and the other methods can also be employed.

Figure 3:
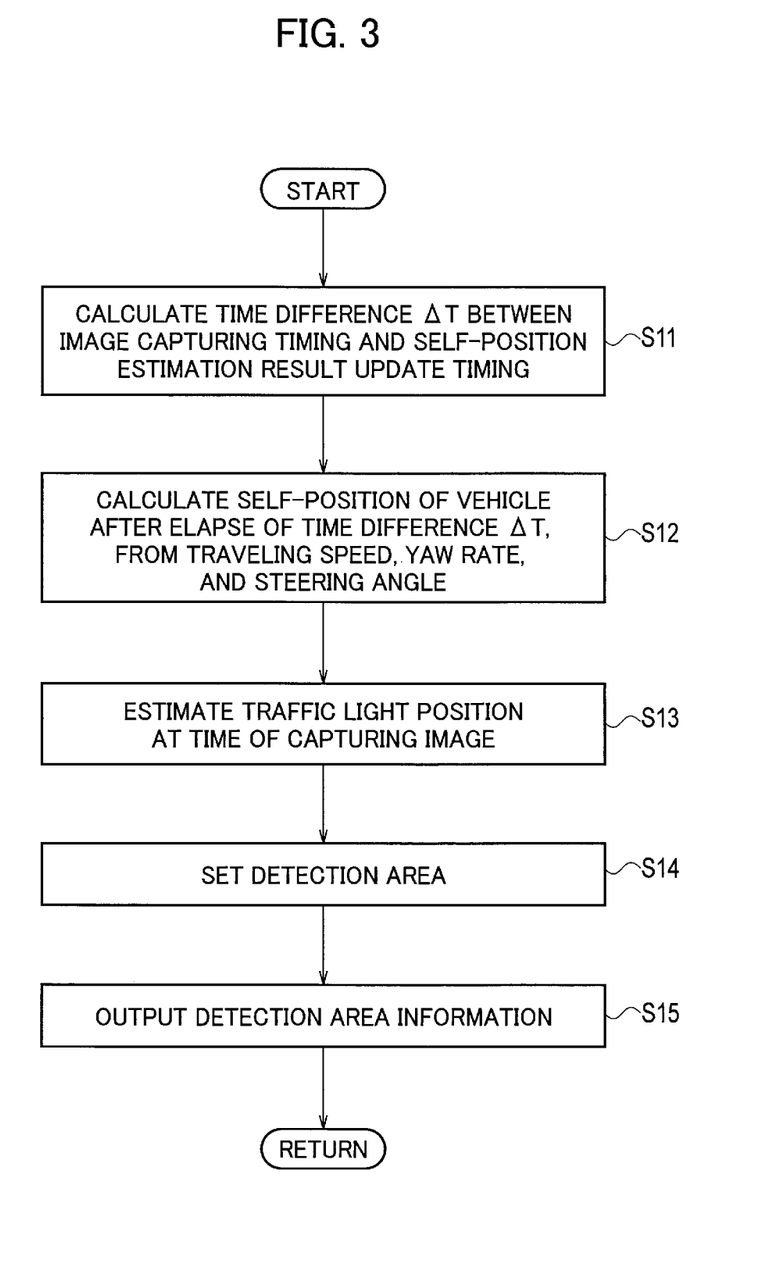
FIG. 3 is a flow chart illustrating a processing procedure of the traffic light recognition device according to the first embodiment of the present invention.

Next, a processing procedure performed by the above-described vehicle behavior estimator 14 and traffic light detection area calculator 15 will be explained with reference to the flow chart illustrated in FIG. 3. First, in step S11, the vehicle behavior estimator 14 acquires a cycle for the self-position estimation result of the vehicle 51 to be updated by the self-position detector 12 and a cycle for an image to be captured by the camera 11. Then, the time difference ΔT between the timing for a self-position estimation result to be updated and the timing for an image to be captured is calculated.

For example, as illustrated in the timing chart of FIGS. 4A and 4B, when a cycle T2 for an image to be captured is twice a cycle T1 (predetermined cycle) for a self-position estimation result to be updated, the self-position information D05 is acquired at the timings of times t1, t2, t3, . . . , i.e., every time the cycle T1 elapses. Moreover, an image is captured at times t11, t13, t15, . . . , i.e., every time the cycle T2 elapses. Then, the time difference ΔT between the respective timings is calculated. Specifically, for times t11, t13, t15, . . . , the time difference ΔT from respective times t1, t3, t5, . . . which are the immediately-previous update timings of the self-position information, is calculated.

Next, in step S12, the vehicle behavior estimator 14 calculates the movement amount of the vehicle 51 from the self-position of the vehicle 51 acquired at time t1 of FIG. 4B on the basis of the traveling speed and yaw rate (or steering angle) of the vehicle 51. Then, the vehicle behavior estimator 14 calculates the self-position of the vehicle 51 at time t11 after an elapse of the time difference ΔT. That is, if a detection area is set within an image using the image captured at time t11 of FIG. 4A and the self-position information D05 updated at time t1 of FIG. 4B, the detection area cannot be set at an appropriate position because the vehicle 51 will move during the time difference ΔT. Accordingly, in the vehicle behavior estimator 14, the movement amount of the vehicle 51 during the time difference ΔT is calculated. Furthermore, in the traffic light detection area calculator 15, the self-position of the vehicle 51 at time t11 is calculated.

Hereinafter, the procedure for calculating a self-position will be explained in detail. The current traveling speed of the vehicle 51 is designated by v [m/s], the current yaw rate by yawrate [rad/sec], the current yaw angle by yaw [rad], an x-coordinate of the current position by cx [m], a y-coordinate by cy [m], and the time difference by ΔT [sec]. Moreover, a turning radius r when a yaw rate is generated is obtained from r=v/yawrate, and a coordinate (ox, oy) of the rotation center is obtained from ox=cx−r×cos (yaw) and oy=cy−r×sin (yaw).

The self-position of the vehicle 51 after correction, i.e., the self-position coordinate (ex, ey) of the vehicle 51 after an elapse of the time difference ΔT can be obtained from Formula (1) and Formula (2) below.

$$ex=\cos(\Delta T \times yawrate) \times (cx-ox) - \sin(\Delta T \times yawrate) \times (cy-oy) + ox \quad (1)$$

$$ey=\sin(\Delta T \times yawrate) \times (cx-ox) + \cos(\Delta T \times yawrate) \times (cy-oy) + oy \quad (2)$$

Moreover, a yaw angle eyaw after correction is obtained from eyaw=yaw+yawrate× ΔT.

On the other hand, when a yaw rate has not been generated, the self-position coordinate (ex, ey) of the vehicle 51 after correction can be obtained from Formula (3) and Formula (4) below.

$$ex=cx+v \times \Delta T \times \cos(yaw) \quad (3)$$

$$ey=cy+v \times \Delta T \times \sin(yaw) \quad (4)$$

Moreover, the yaw angle eyaw after correction is eyaw=yaw.

That is, in step S12, on the basis of the self-position of the vehicle 51 acquired from the vehicle behavior information D07 and self-position information D05 output from the vehicle behavior estimator 14, the above-described calculation is executed, so that the self-position of the vehicle 51 after an elapse of the time difference ΔT from time t1 can be calculated.

Subsequently, in step S13 in FIG. 3, the traffic light detection area calculator 15 predicts the position of a traffic light of when an image has been captured. That is, since the information about the self-position and image captured by the camera 11 at time t11 of FIG. 4A are obtained, a position at which a traffic light is located within the image can be estimated from the self-position and the position information about a traffic light included in the map information.

In step S14, the traffic light detection area calculator 15 sets, as the detection area, an area where a traffic light is included within the image, and in step S15 outputs this information as the traffic light detection area information D08. Subsequently, the traffic light recognition unit 16 detects a traffic light from within the set detection area, and detects the lighting color of this traffic light. Thus, a detection area can be set within an image, and the lighting color of a traffic light present within this detection area can be recognized.

Figure 5:
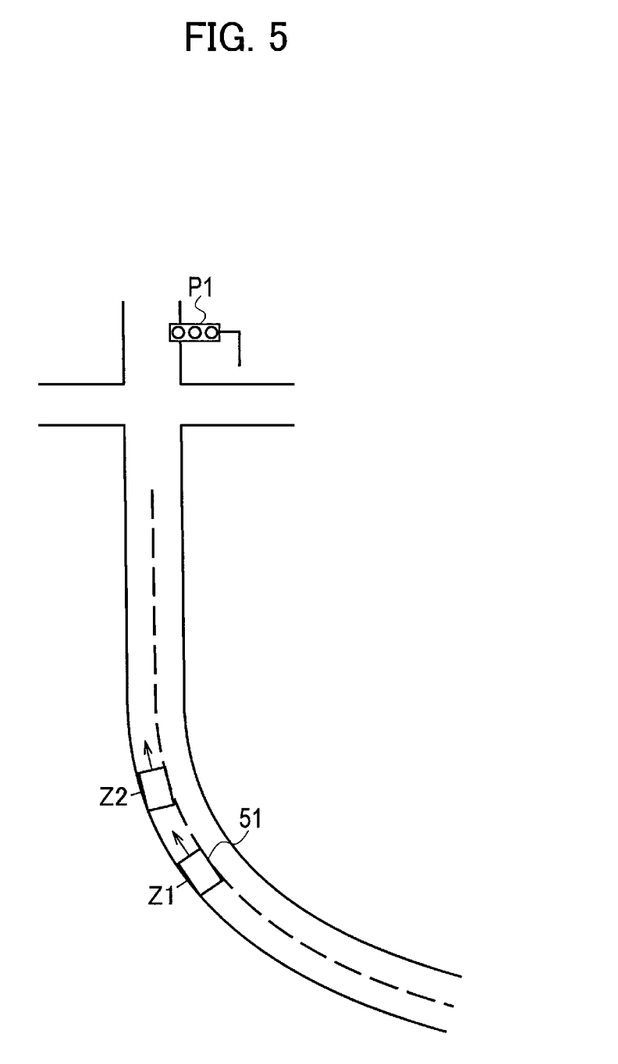
FIG. 5 relates to the first embodiment of the present invention, which is an explanatory view illustrating a change of the self-position when a vehicle travels on a curve road.
Figure 6:
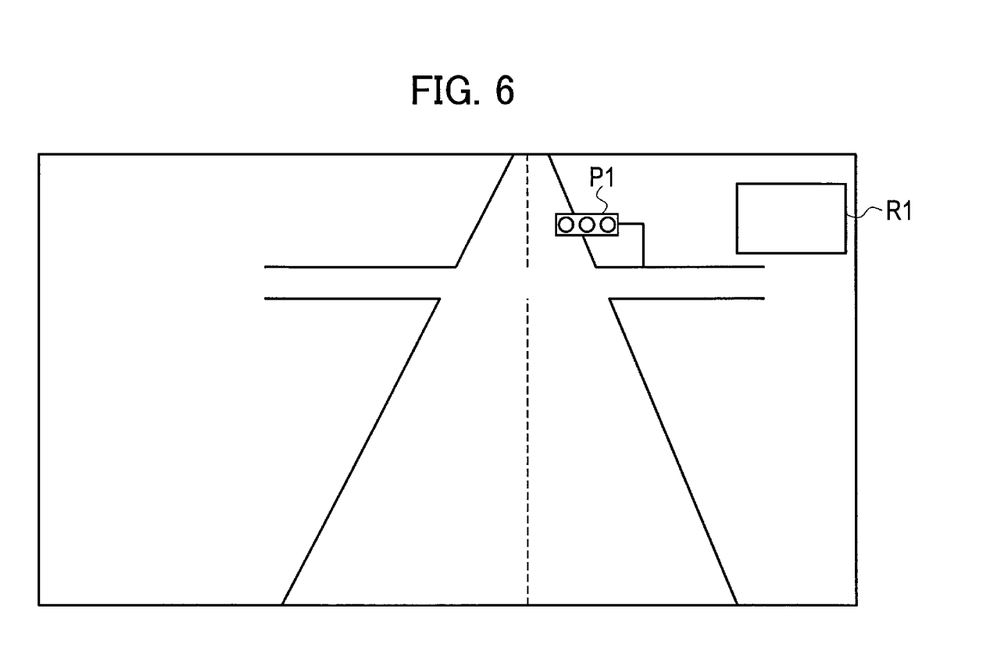
FIG. 6 is an explanatory view illustrating the position of a detection area when the detection area is set onto an image without taking into consideration the movement amount of a vehicle due to a time difference ΔT.

Next, a change of the detection area due to the time difference ΔT will be explained with reference to the explanatory views illustrated in FIG. 5 to FIG. 7. FIG. 5 illustrates a case where the vehicle 51 travels on a curve road curved to the right. As illustrated in FIG. 5, a case will be considered where the vehicle 51 passes through a point Z1 on the curve road at time t1 (see FIGS. 4A and 4B) and passes through a point Z2 after an elapse of the time difference ΔT.

When the movement amount of the vehicle 51 during the time difference ΔT is not taken into consideration, the self-position is estimated when the vehicle 51 passes through the point Z1 of FIG. 5, and an image is captured when the vehicle 51 passes through the point Z2 after an elapse of the time difference ΔT. Accordingly, if a detection area is set on the basis of these results, then as illustrated in FIG. 6, a detection area R1 will be set in the right direction with respect to a traffic light P1 present within the image, and thus the traffic light cannot be detected.

Figure 7:
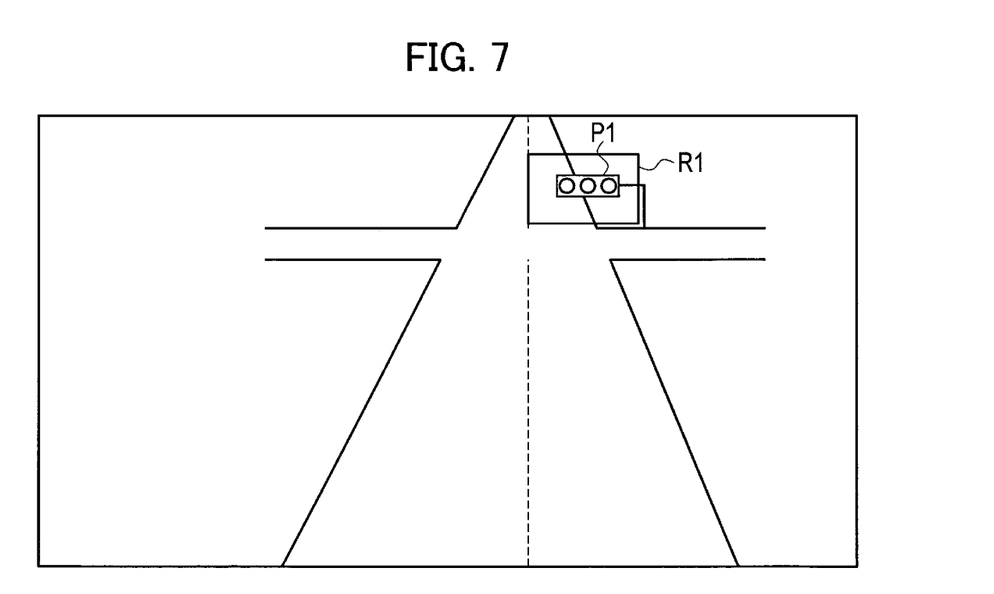
FIG. 7 is an explanatory view illustrating the position of a detection area when the detection area is set onto an image taking into consideration the movement amount of a vehicle due to the time difference ΔT.

In contrast, when the movement amount of the vehicle 51 during the time difference ΔT is taken into consideration, the detection area R1 is set on the basis of the self-position of the vehicle 51 and image when the vehicle 51 passes through the point Z2 of FIG. 5, and therefore as illustrated in FIG. 7, the detection area R1 will be set at a position appropriate for the traffic light P1 present within the image. As explained above, in this embodiment the detection area R1 for recognizing the traffic light P1 can be accurately set by taking into consideration the movement amount of the vehicle 51 during the time difference ΔT.

Note that, the above-described self-position detector 12, traffic light position estimator 13, vehicle behavior estimator 14, traffic light detection area calculator 15, and traffic light recognition unit 16 can be realized using a microcontroller provided with a CPU, a memory, and an input/output unit. Specifically, the CPU constitutes a plurality of information processing units (12 to 16) of the microcontroller by executing a pre-installed computer program. A part of the memory of the microcontroller constitutes a map data base for storing the map information D02. Note that the microcontroller may also be used as an ECU used for other controls (e.g., automatic operation control) related to a vehicle.

In this manner, in the traffic light recognition device 100 according to the first embodiment, the detection area R1 is set within an image on the basis of the estimated position of a traffic light obtained from the map information D02 and a displacement amount of the estimated position of a traffic light due to a vehicle behavior. Accordingly, the detection area R1 for detecting the traffic light P1 can be accurately set.

Moreover, since the traffic light detection area calculator 15 estimates a vehicle movement amount on the basis of a vehicle behavior and a preset predetermined time and sets the detection area R1 on the basis of the estimated position on the image of the traffic light and the vehicle movement amount, accurate recognition is enabled.

Moreover, even when there is the time difference ΔT between a timing for the self-position estimation result of the vehicle 51 to be updated and a timing for an image to be captured, both the timings can be aligned by estimating the movement amount of the vehicle 51 during the time difference ΔT on the basis of a vehicle behavior. Accordingly, the detection area R1 can be accurately set on an image captured by the camera 11, and in turn the lighting state of the traffic light P1, i.e., red, green, or yellow lighting color, the lighting state of an arrow, or the like, can be accurately recognized.

Moreover, the setting can be made so as to change the time difference ΔT in accordance with a predetermined cycle, i.e., the cycle T1 illustrated in FIGS. 4A and 4B, at which the self-position estimation result of the vehicle 51 is updated. For example, the time difference ΔT can be increased as the cycle T1 increases. By setting in this manner, an appropriate setting of the detection area in accordance with a change of the cycle for the self-position estimation result to be updated, can be made.

Furthermore, since the movement amount of the vehicle 51 during the time difference ΔT is calculated using the traveling speed and yaw rate of the vehicle as a vehicle behavior, a displacement amount of the estimated position of a traffic light due to a vehicle behavior can be accurately obtained, and in turn an accurate setting of the detection area R1 is enabled.

Moreover, the movement amount of the vehicle 51 during the time difference ΔT can be also calculated using the traveling speed and steering angle (steering amount) of the vehicle as a vehicle behavior. Then, also in the case where the steering angle is used, a displacement amount of the estimated position of a traffic light due to a vehicle behavior can be accurately obtained, and in turn an accurate setting of the detection area R1 is enabled.

Furthermore, since the self-position information about the vehicle 51 at the point Z2 illustrated in FIG. 5 is estimated on the basis of a vehicle behavior, the estimation accuracy of a self-position might decrease when the value of the vehicle behavior information D07 is large. Then, when the value of the vehicle behavior information D07 is large, a decrease in estimation accuracy can be compensated by increasing the range of the detection area R1 to be set by the traffic light detection area calculator 15.

Figure 8:
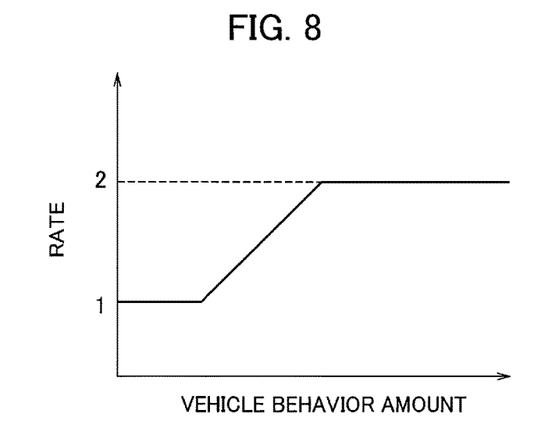
FIG. 8 is the characteristic chart illustrating a relationship between the magnitude of a vehicle behavior amount and the size of a detection area.

Specifically, as illustrated in a characteristic chart of FIG. 8, when the size of the detection area R1 during the normal time is defined as "1", the size of the detection area R1 is increased as the vehicle behavior amount increases. Then, a certain magnitude, e.g., a magnitude which is twice the magnitude at normal time, is set as an upper limit, and when the vehicle behavior amount reaches this magnitude, the detection area R1 is not allowed to be increased any more. Thus, the range of the detection area R1 will increase as the vehicle behavior amount increases, and therefore even when the estimation accuracy of the traffic light position decreases due to an increase of the vehicle behavior amount, the detection area R1 can be set so that the traffic light P1 will not frame out from the detection area R1.

Explanation of Modified Example of First Embodiment

In the first embodiment described above, as illustrated in FIGS. 4A and 4B, an example is illustrated in which the cycle T2 becomes twice the cycle T1. However, in the case where the cycles T1 and T2 do not have a multiple number relationship, the time difference ΔT will vary. Hereinafter, an explanation will be given with reference to the timing chart illustrated in FIGS. 9A and 9B.

Figure 9A:
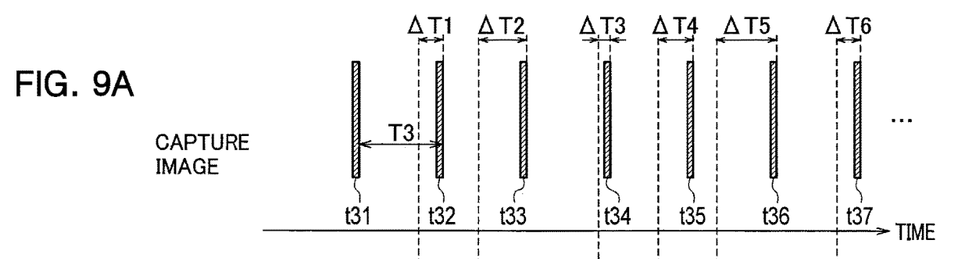
Figure 9B:
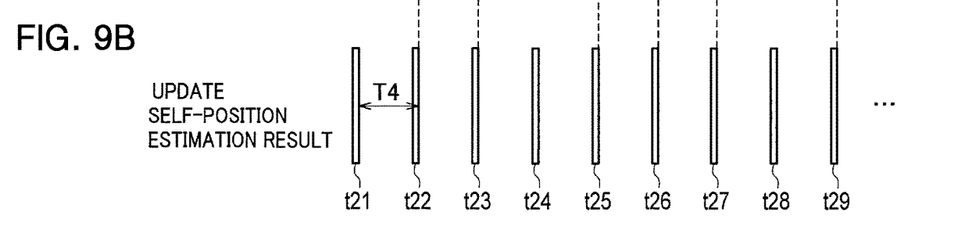

FIG. 9A illustrates a timing for an image to be captured, and FIG. 9B illustrates a timing for a self-position estimation result to be updated. Then, updating the self-position estimation result is executed at cycle T4, and capturing an image is executed at cycle T3. In this case, once an image is captured, the detection area R1 will be set using a self-position estimation result immediately before this time.

For example, the time differences ΔT1 to ΔT6, such as a time difference ΔT1 between time t22 and time t32 and a time difference ΔT2 between time t23 and time t33, are calculated and the movement amount of the vehicle 51 is calculated using each of the time differences ΔT1 to ΔT5.

Then, also in such a configuration, as with the above-described first embodiment, the movement amount of the vehicle 51 during each of the time differences ΔT1 to ΔT5 is calculated and the position of the vehicle 51 is corrected on the basis of this movement amount, so the detection area to be set within the image can be accurately set.

Explanation of Second Embodiment

Next, a second embodiment of the present invention will be explained. Since the device configuration is the same as those of FIG. 1 and FIG. 2 illustrated in the first embodiment, the explanation thereof will be omitted. Hereinafter, the processing procedure of the traffic light recognition device 100 according to the second embodiment will be explained with reference to the flow chart illustrated in FIG. 10. First, in step S31, the vehicle behavior estimator 14 determines, on the basis of various information, such as the traveling speed, yaw rate, and steering angle of the vehicle 51, whether or not a vehicle behavior has a value equal to or greater than a predetermined value.

Figure 10:
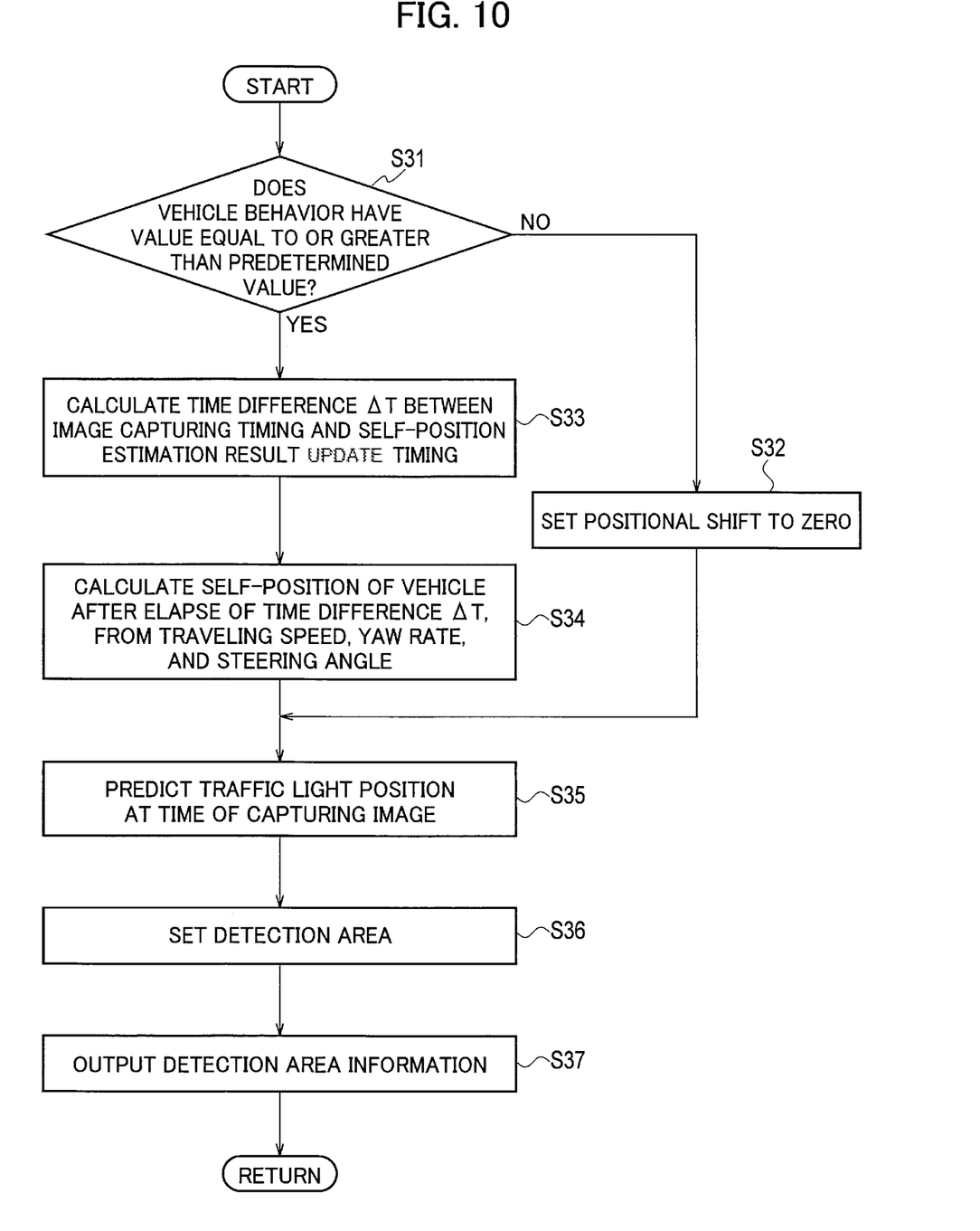
FIG. 10 is a flow chart illustrating a processing procedure of a traffic light recognition device according to a second embodiment of the present invention.

Then, if it is determined that the vehicle behavior has a value less than a predetermined value, such as because the vehicle 51 is traveling at a low speed or when it is stopped (NO in step S31), it can be determined that the vehicle behavior amount is small and negligible during the time difference ΔT between a timing for the self-position estimation result of the vehicle 51 to be updated and a timing for an image to be captured. Accordingly, in step S32, the vehicle behavior estimator 14 regards the vehicle behavior information D07 as zero, and proceeds to the processing in step S35.

On the other hand, when the vehicle behavior has a value equal to or greater than a predetermined value ("YES" in step S31), the procedure of steps S33 to S37 is executed. The explanation of the procedure of steps S33 to S37 will be omitted because it is the same as the procedure of steps S11 to S15 illustrated in FIG. 3.

As explained above, in the traffic light recognition device 100 according to the second embodiment, on the basis of the behavior of the vehicle 51, only when the behavior of the vehicle 51 has a value equal to or greater than a predetermined value, the movement amount during the time difference ΔT is calculated to correct the position of the vehicle 51. In other words, when the behavior of the vehicle 51 is small, it can be estimated that during the time difference ΔT, the relative positional relationship, in particular in the traveling direction, between the self-position estimation result of the vehicle 51 and the self-position of the vehicle 51 when an image has been captured will not vary a lot. Therefore, in such a case, the movement amount of the vehicle 51 during the time difference ΔT will not be calculated. As the result, unnecessary calculation can be omitted and the calculation load can be reduced.

Explanation of Third Embodiment

Figure 11:
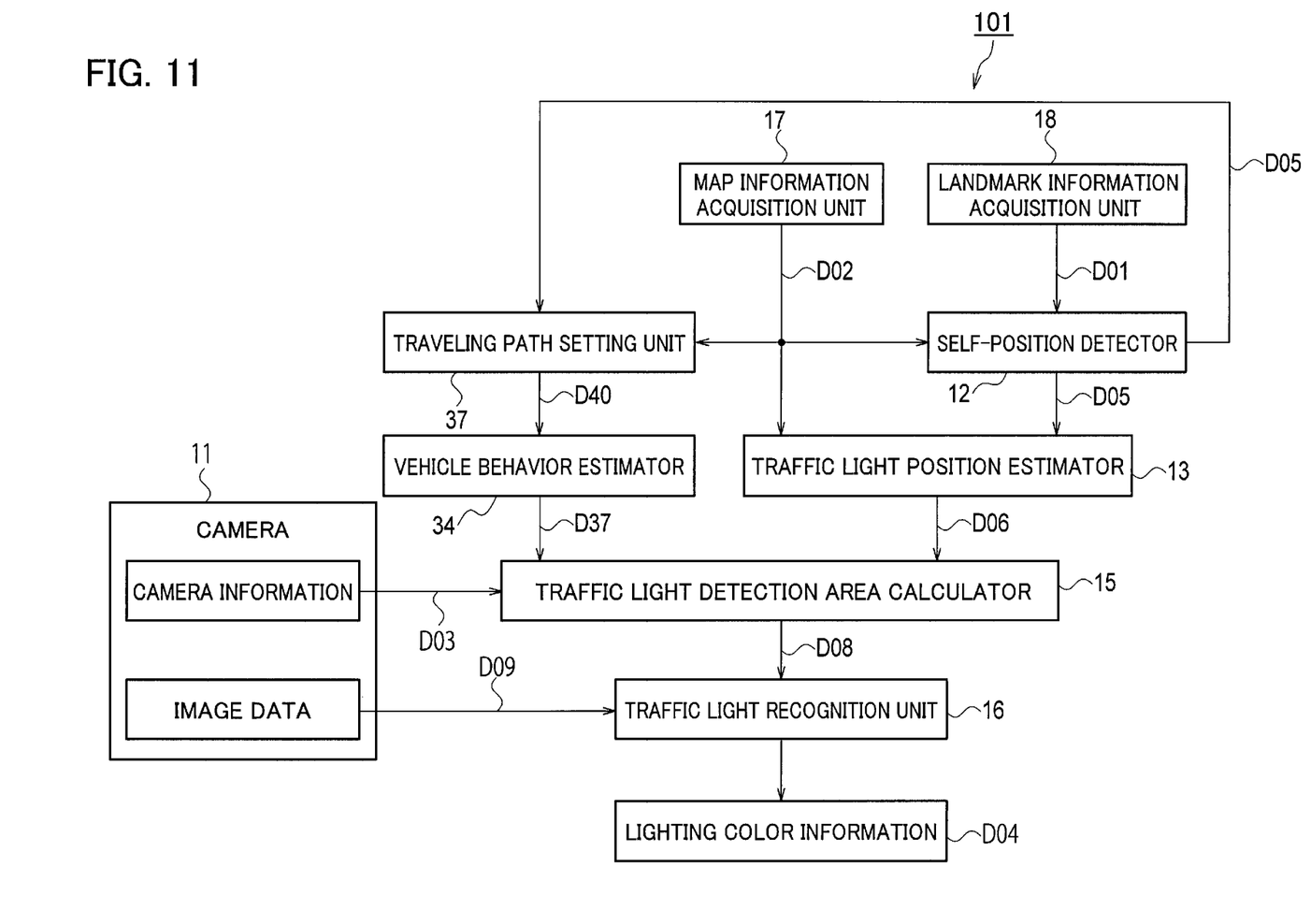
FIG. 11 is a block diagram illustrating a detailed configuration of a traffic light recognition device according to a third embodiment of the present invention.

Next, a third embodiment of the present invention will be explained. FIG. 11 is a block diagram illustrating a configuration of a traffic light recognition device 101 according to the third embodiment. This traffic light recognition device 101 differs from the above-described traffic light recognition device 100 illustrated in FIG. 2 in that it has a traveling path setting unit 37. Moreover, the processing by a vehicle behavior estimator 34 differs. Since the other configuration is the same as that of FIG. 2, the same component as that of FIG. 2 is given the same reference sign to omit the explanation of the configuration thereof.

The traveling path setting unit 37 receives the map information D02 and self-position information D05 as the inputs, and extracts a traveling path on which the vehicle 51 is predicted to travel in the future. Then, the traveling path setting unit 37 outputs the extracted traveling path as traveling path information D40 to the vehicle behavior estimator 34.

The vehicle behavior estimator 34 calculates, on the basis of the traveling path information D40, the movement amount of the vehicle 51 of during the time difference ΔT from a timing for a self-position estimation result to be updated to a timing for an image to be captured, and outputs this movement amount as vehicle behavior information D37 to the traffic light detection area calculator 15.

Figure 12:
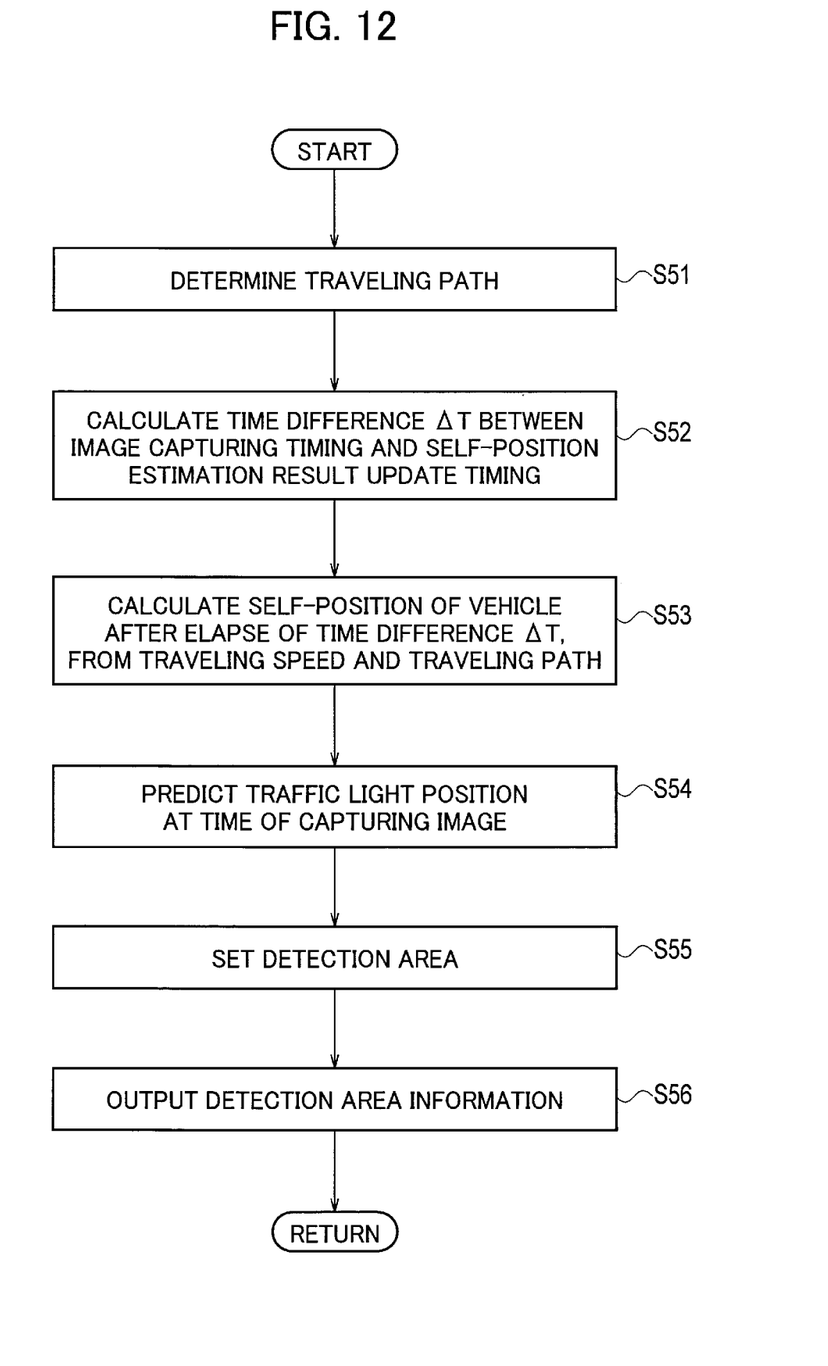
FIG. 12 is a flow chart illustrating a processing procedure of the traffic light recognition device according to the third embodiment of the present invention.

Next, the processing procedure of the traffic light recognition device 101 according to the third embodiment will be explained with reference to the flow chart illustrated in FIG. 12. First, in step S51, the traveling path setting unit 37 determines a traveling path of the vehicle 51 on the basis of the self-position information D05 and map information D02. In this processing, since a traveling path on which the vehicle 51 is currently traveling and a traveling position at which the vehicle 51 is currently traveling can be recognized on the basis of the traveling path of the vehicle 51 included in the map information D02 and self-position information D05, a traveling path on which the vehicle 51 would travel in the future can be determined.

In step S52, the vehicle behavior estimator 14 acquires a cycle for the self-position estimation result of the vehicle 51 to be updated by the self-position detector 12 and a cycle for an image to be captured by the camera 11. Then, the vehicle behavior estimator 14 calculates the time difference ΔT between the timing for a self-position estimation result to be updated and the timing for an image to be captured. The detailed explanation of this processing is omitted because it is the same as the processing of step S11 illustrated in FIG. 3.

Next, in step S53, the vehicle behavior estimator 34 calculates, on the basis of the traveling speed and traveling path of the vehicle, the movement amount of the vehicle 51 of during the time difference ΔT with respect to the self-position estimated at time t1 of FIG. 4B. This movement amount is output to the traffic light detection area calculator 15 as the vehicle behavior information D37. Then, the traffic light detection area calculator 15 calculates the self-position of the vehicle 51 at time t11 on the basis of this vehicle behavior information D37.

Subsequently, in step S54, the traffic light detection area calculator 15 predicts the position of a traffic light when an image was captured. That is, the traffic light detection area calculator 15 estimates the position of a traffic light relative to the vehicle 51, on the basis of the self-position calculation result of the vehicle 51 calculated at time t11 in the processing of step S53 and the image.

In step S55, the traffic light detection area calculator 15 sets, as the detection area, an area where a traffic light is included within the image, and in step S56 outputs this information as the traffic light detection area information D08. Subsequently, the traffic light recognition unit 16 detects a traffic light from within the set detection area, and detects the lighting color of this traffic light. Thus, a detection area can be set within an image, and the lighting color of a traffic light present within this detection area can be recognized.

Figure 13A:
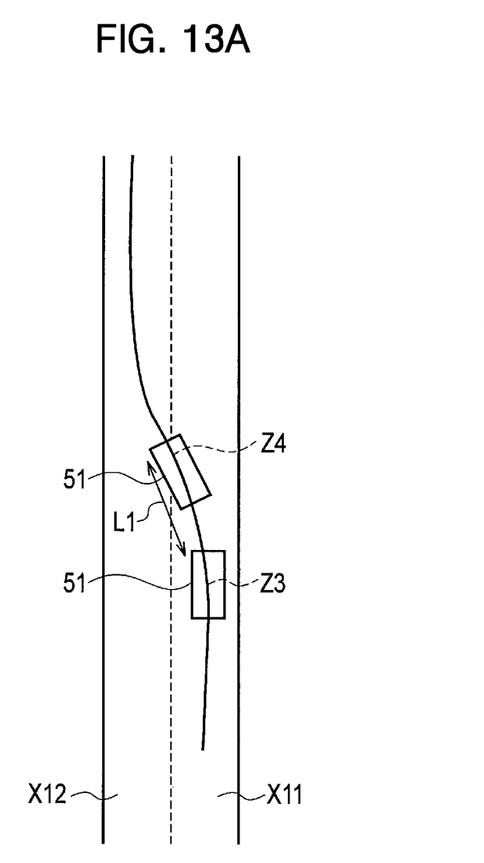
FIG. 13A is an explanatory view illustrating a behavior when a vehicle changes lanes.
Figure 13B:
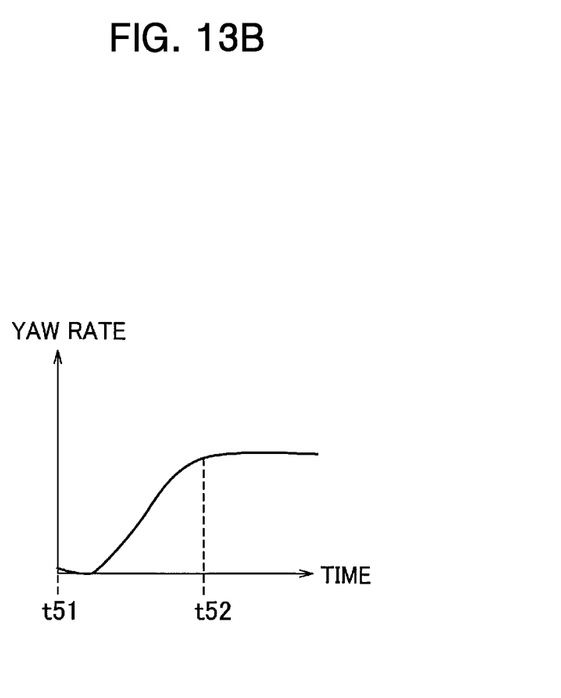
FIG. 13B is a characteristic chart illustrating a change in a yaw rate versus the lapse of time.

Hereinafter, the detail of the processing for calculating the vehicle behavior information D37 in the processing of step S53 will be explained with reference to FIGS. 13A and 13B. FIG. 13A is an explanatory view illustrating a behavior of the vehicle 51 when the vehicle 51 changes lanes from a right lane X11 to left lane X12 on a two-lane road. Moreover, FIG. 13B is a characteristic chart illustrating a change in a yaw rate versus the lapse of time. The times when the vehicle 51 is traveling at points Z3 and Z4 of FIG. 13A correspond to times t51 and t52 illustrated in FIG. 13B, respectively.

When the self-position of the vehicle 51 is estimated using a yaw rate and/or steering angle when the vehicle 51 changes lanes, the estimation accuracy of the self-position will decrease. That is, at the point Z3 at which the vehicle 51 has not changed lanes, since the yaw rate has not yet generated as illustrated at time t51 of FIG. 13B, the accuracy to estimate the self-position of the vehicle 51 after the elapse of the time difference ΔT will decrease. Moreover, even when the vehicle 51 starts to change lanes, a change rate of the yaw rate or steering angle will increase at the time of changing lanes (in the time period from t51 to t52), the detection accuracy of the behavior of the vehicle 51 will decrease in such a case.

Then, in the processing of step S53, the movement amount of the vehicle 51 is calculated using the traveling path information D40 and the traveling speed of the vehicle. That is, a moving distance L1 of the vehicle 51 is obtained from "traveling speed×ΔT", and therefore a position proceeding by the moving distance L1 along the traveling path relative to the self-position acquired at the time of updating the self-position estimation result immediately before when an image was captured (at the time point of time t1 of FIGS. 4A and 4B) may be set as the self-position of the vehicle 51 after the elapse of the time difference ΔT.

Moreover, when the vehicle 51 is traveling under automatic operation control, the position of the lane change can be recognized in advance. Accordingly, the direction of the vehicle 51 at the point Z4 of FIG. 13A can be calculated, so the self-position of the vehicle 51 when an image has been captured can be calculated. Thus, by estimating the vehicle behavior using the traveling path set by the traveling path setting unit 37, the movement amount of the vehicle 51 during the time difference ΔT can be more accurately calculated.

In this manner, in the traffic light recognition device 101 according to the third embodiment, the self-position of the vehicle 51 after the elapse of the time difference ΔT is estimated on the basis of the traveling speed of the vehicle 51 and the traveling path information D40 indicative of a traveling path on which the vehicle 51 would travel in the future. Accordingly, also when the vehicle 51 changes lanes and a yaw rate is not initially generated but subsequently the yaw rate abruptly increases, the self-position of the vehicle 51 when an image has been captured can be accurately estimated. Accordingly, the detection area to be set within the image can be accurately set.

In the foregoing, the traffic light recognition devices and traffic light recognition methods of the present invention have been explained on the basis of the illustrated embodiments, but the present invention is not limited thereto. The configuration of each unit can be replaced with any configuration having a similar function.

REFERENCE SIGNS LIST 11 camera (imaging unit)
12 self-position detector
13 traffic light position estimator
14, 34 vehicle behavior estimator
15 traffic light detection area calculator (traffic light detection area setting unit)
16 traffic light recognition unit
17 map information acquisition unit
18 landmark information acquisition unit
37 traveling path setting unit
51 vehicle
100, 101 traffic light recognition device
D01 landmark information
D02 map information
D03 camera information
D04 lighting color information
D05 self-position information
D06 traffic light relative positional information
D07 vehicle behavior information
D08 traffic light detection area information
D09 image data
D37 vehicle behavior information
D40 traveling path information
P1 traffic light
R1 detection area
X11 right lane
X12 left lane

The invention claimed is:

1. A traffic light recognition device, comprising:
a camera mounted on a vehicle and configured to capture an image around the vehicle;
a processor; and
a memory coupled to the processor, the memory storing instructions which, when executed by the processor, cause the processor to:
acquire map information around the vehicle;
detect a self-position of the vehicle on a map;
estimate a position of a traffic light on an image on a basis of the self-position and the map information;
estimate a vehicle behavior including an amount of steering of the vehicle;
set a detection area of the traffic light on the image on a basis of the estimated position on the image of the traffic light and a displacement amount of the position on the image of the traffic light due to the vehicle behavior;
detect a traffic light from the detection area, wherein a size of the detection area is set based on an amount the vehicle behavior increases;
when the vehicle behavior has a value equal to or greater than a preset predetermined value, set the detection area on a basis of the estimated position on the image of the traffic light and a displacement amount of the position on the image of the traffic light due to the amount of the dynamic vehicle behavior; and
when the vehicle behavior has a value less than the predetermined value, set the detection area on a basis of the estimated position on the image of the traffic light.

2. The traffic light recognition device according to claim 1, wherein the memory further stores instructions which, when executed by the processor, cause the processor to:
estimate the amount of the vehicle behavior on a basis of the vehicle behavior and a preset predetermined time, and set the detection area on the basis of the estimated position on the image of the traffic light and the amount of the vehicle behavior.

3. The traffic light recognition device according to claim 2, wherein the memory further stores instructions which, when executed by the processor, cause the processor to:
set the predetermined time on a basis of a time difference between a timing to capture an image and a timing at which the self-position has been detected.

4. The traffic light recognition device according to claim 3, wherein the memory further stores instructions which, when executed by the processor, cause the processor to:
detect a self-position of the vehicle at a predetermined cycle; and
set the time difference in accordance with the predetermined cycle.

5. The traffic light recognition device according to claim 1, wherein the memory further stores instructions which, when executed by the processor, cause the processor to:
set, on a basis of the self-position and the map information, a traveling path on which the vehicle will travel in the future; and
estimate the vehicle behavior on a basis of the traveling path on which the vehicle will travel in the future.

6. A traffic light recognition device, comprising:
a camera mounted on a vehicle and configured to capture an image around the vehicle;
a processor; and
a memory coupled to the processor, the memory storing instructions which, when executed by the processor, cause the processor to:
acquire map information around the vehicle;
detect a self-position of the vehicle on a map;
estimate a position of a traffic light on an image on a basis of the self-position and the map information;
estimate a vehicle behavior comprising at least one of a speed of the vehicle, a yaw rate of the vehicle, or an amount of steering of the vehicle;
set a detection area of the traffic light on the image on a basis of the estimated position on the image of the traffic light, the vehicle behavior, and a difference between a timing for the image to be captured and a timing for the self-position to be updated; and
detect a traffic light from the detection area.

7. A traffic light recognition method comprising the steps of:
capturing an image around a vehicle;
acquiring map information around the vehicle;
detecting a self-position of the vehicle on a map;
estimating a position of a traffic light on an image on a basis of the self-position and the map information;
estimating a vehicle behavior including an amount of steering of the vehicle;
setting a detection area of the traffic light onto the image on a basis of the estimated position on the image of the traffic light and a displacement amount of the position on the image of the traffic light due to the vehicle behavior, wherein a size of the detection area is set based on an amount the vehicle behavior increases;
detecting a traffic light from the detection area;
when the vehicle behavior has a value equal to or greater than a preset predetermined value, setting the detection area on a basis of the estimated position on the image of the traffic light and a displacement amount of the position on the image of the traffic light due to the amount of the dynamic vehicle behavior; and
when the vehicle behavior has a value less than the predetermined value, setting the detection area on a basis of the estimated position on the image of the traffic light.

8. A traffic light recognition method comprising the steps of:
capturing an image around a vehicle;
acquiring map information around the vehicle;
detecting a self-position of the vehicle on a map;
estimating a position of a traffic light on an image on a basis of the self-position and the map information;
estimating a vehicle behavior comprising at least one of a speed of the vehicle, yaw rate of the vehicle, or an amount of steering of the vehicle;
setting a detection area of the traffic light onto the image on a basis of the estimated position on the image of the traffic light, the vehicle behavior, and a difference between a timing for the image to be captured and a timing for the self-position to be updated; and
detecting a traffic light from the detection area.

\* \* \* \* \*